United States Patent [19]

Kanca et al.

[11] Patent Number: 5,792,494
[45] Date of Patent: Aug. 11, 1998

[54] GUM BASE MANUFACTURING METHOD USING ELASTOMER EMULSIONS

[75] Inventors: Kenneth M. Kanca, Parlin; Edward J. Zuromski, Bridgewater; Richard Santora, Robbinsville, all of N.J.

[73] Assignee: L. A. Dreyfus Co., Edison, N.Y.

[21] Appl. No.: 693,807

[22] Filed: Aug. 1, 1996

[51] Int. Cl.$^6$ ........................ A23G 3/30
[52] U.S. Cl. ........................ 426/3; 426/5
[58] Field of Search ............... 426/3, 5, 6, 519

[56] References Cited

U.S. PATENT DOCUMENTS

| | | | |
|---|---|---|---|
| H1241 | 10/1993 | Synosky et al. | 426/3 |
| 1,975,447 | 10/1934 | Canning. | |
| 2,050,272 | 8/1936 | Canning. | |
| 2,124,235 | 7/1938 | Mueller-Cunradi et al. | |
| 2,273,425 | 2/1942 | Traylor. | |
| 2,284,804 | 6/1942 | De Angelis. | |
| 2,289,407 | 7/1942 | Boys. | |
| 2,476,687 | 7/1949 | Smith. | |
| 3,503,917 | 3/1970 | Burke. | |
| 3,573,933 | 4/1971 | MacLeod. | |
| 3,632,358 | 1/1972 | Echeandia et al. | |
| 3,840,382 | 10/1974 | Burke. | |
| 3,984,574 | 10/1976 | Comollo | 426/4 |
| 3,995,064 | 11/1976 | Ehrgott et al. | 426/3 |
| 4,305,962 | 12/1981 | Del Angel | 426/3 |
| 4,352,822 | 10/1982 | Cherukuri et al. | 426/4 |
| 4,379,169 | 4/1983 | Reggio et al. | 426/3 |
| 4,459,311 | 7/1984 | DeTora et al. | 426/3 |
| 4,490,395 | 12/1984 | Cherukuri et al. | 426/3 |
| 4,500,547 | 2/1985 | Puglia et al. | 426/3 |
| 4,525,363 | 6/1985 | D'Amelia et al. | 426/3 |
| 4,587,125 | 5/1986 | Cherukuri et al. | 426/3 |
| 4,737,366 | 4/1988 | Gergely et al. | 426/5 |
| 4,775,537 | 10/1988 | Calabro et al. | 426/3 |
| 4,842,870 | 6/1989 | Dokuzovic et al. | 426/3 |
| 5,085,872 | 2/1992 | Patel et al. | 426/4 |
| 5,098,720 | 3/1992 | Hartman et al. | 426/3 |
| 5,100,678 | 3/1992 | Reed et al. | 426/3 |
| 5,116,626 | 5/1992 | Synosky et al. | 426/3 |
| 5,132,121 | 7/1992 | Orfan et al. | 426/3 |
| 5,135,760 | 8/1992 | Degady et al. | 426/5 |
| 5,200,213 | 4/1993 | Orfan et al. | 426/3 |
| 5,248,228 | 9/1993 | Giardina | 406/56 |
| 5,270,060 | 12/1993 | Foster et al. | 426/3 |
| 5,274,182 | 12/1993 | Weider et al. | 560/347 |
| 5,286,499 | 2/1994 | Courtright | 426/3 |
| 5,286,500 | 2/1994 | Synosky et al. | 426/3 |
| 5,397,580 | 3/1995 | Song et al. | 426/5 |
| 5,437,878 | 8/1995 | Panhorst et al. | 426/4 |
| 5,441,730 | 8/1995 | Gough et al. | 424/70.11 |
| 5,567,450 | 10/1996 | Zuromski et al. | 426/5 |

*Primary Examiner*—Arthur L. Corbin
*Attorney, Agent, or Firm*—Steven P. Shurtz; Brinks Hofer Gilson & Lione

[57] ABSTRACT

A process for producing a chewing gum base comprising pumping an elastomer/water emulsion having a viscosity less than about $2\times10^6$ cps to at least two mixers, introducing a filler material, introducing an elastomer plasticizer and mixing the contents of the mixers under conditions that substantially remove the water.

30 Claims, 1 Drawing Sheet

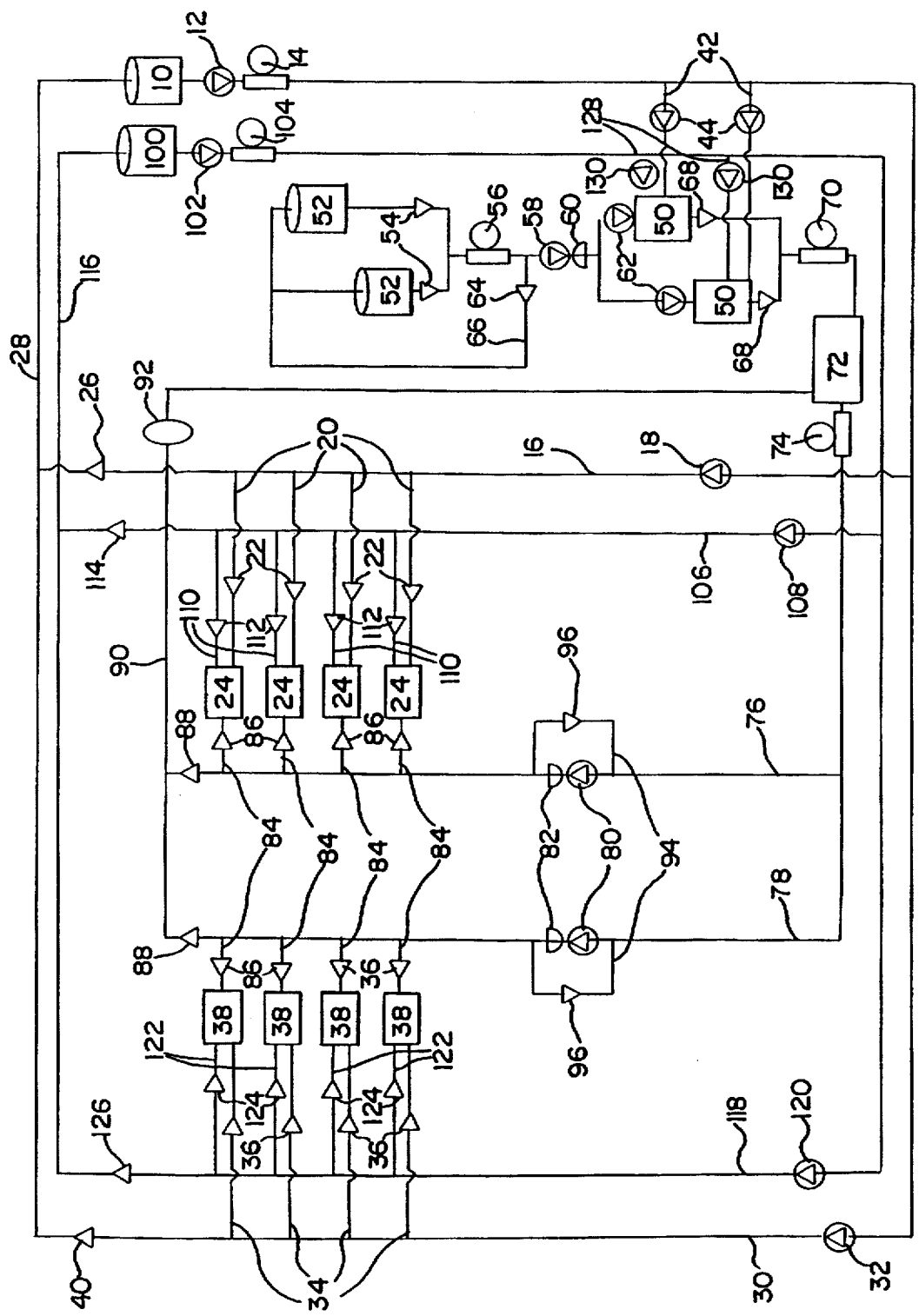

5,792,494

1

GUM BASE MANUFACTURING METHOD USING ELASTOMER EMULSIONS

BACKGROUND OF THE INVENTION

This invention provides an economical process for the manufacture of gum base. Specifically, this invention uses certain elastomeric ingredients in the form of a latex emulsion in a process to produce gum base.

A typical gum base includes an elastomer (e.g. styrene-butadiene rubber, polyvinyl acetate, natural rubber, and the like), elastomer plasticizers (e.g. rosin esters or terpene resins), fillers, and optional ingredients such as softeners (e.g. fats, oils or mono- or diglycerides), waxes, colorants and antioxidants. A large variety of gum bases having different chewing characteristics are made by varying the gum base ingredients, and their relative proportions.

Currently, solid elastomers provide the elastomer component of the gum base. Even some elastomers that are available in latex emulsion form, such as styrene-butadiene rubber, are coagulated into a solid form first, then used to make gum base.

Solid elastomers are difficult to process into gum base. To process a solid elastomer, it is typically chopped into smaller pieces, and the chunks are fed to gum base mixers, where the polymer is heated, and compounded in the presence of softeners or elastomer plasticizers. Such a process consumes a great deal of time, energy and labor.

In addition, formulations for gum bases vary widely according to customer requirements and specifications. Consequently, conventional gum base manufacture can be costly for smaller production run gum bases, because the differences among the formulae of such bases preclude the economies of scale achieved in large production runs.

Typically, a gum base is made on a production line that includes one or more gum base mixers and ingredient addition equipment. Once one base is made, new ingredients must be preweighed and delivered to the gum base mixers for manufacture of a different base. Thus, for a particular base with a short production run, the costs are proportionately higher due to manufacturing delays caused by the preparation and delivery of ingredients. However, economies of scale for short production run gum bases may be achieved if ingredients that are common to most gum bases are prepared in advance on a large scale. Then, these ingredients are delivered to the gum base mixers where additional ingredients are added to conform the formulation to the gum base desired.

Moreover, conventional processes for gum base manufacture can involve many individual blending steps, in some cases up to 30 or more separate additions of ingredients, depending upon the ingredients and equipment. Individually measuring and delivering each ingredient is labor intensive and increases the risk of undesirable variation in each batch of finished gum base. Substantial cost savings may be achieved by premixing the ingredients common to many gum bases on a large scale for delivery to the gum base mixers, and adjusting the formulation to suit the desired gum base later. Further, using a common premix in multiple batches decreases the risk of undesirable variations in the finished gum base.

Finally, gum base firmness and viscosity depend on the mixing time of the formulation, because extended compounding times can break down the elastomers in the gum base, and lower the elastomer mooney viscosity (and therefore the gum base viscosity). Therefore, longer compounding times produce undesirable variations in the gum base firmness and viscosity. Lowering the compounding time would lead to a greater consistency in a desirable texture and chew.

SUMMARY OF THE INVENTION

This invention is a process for large-scale gum base manufacture that allows different gum bases to be made from a common elastomer emulsion wherein the emulsion has a viscosity less than about $2 \times 10^6$ cps, and, therefore, can be pumped throughout a gum base manufacturing plant.

Such a common elastomer emulsion is pumped to one or more gum base mixers where additional gum base ingredients are added. The elastomer and the additional ingredients are blended in the gum base mixers to form at least a first finished base. However, at the same or different time(s), in other gum base mixers, different gum bases can be made from the same emulsion by varying the proportions of the additional ingredients used or by adding different ingredients.

The elastomer emulsion can also be used as a carrier for other gum base ingredients. For example, liquid or liquefied elastomer plasticizer, filler slurry or a preblend of various gum base ingredients is added to the elastomer emulsion to make a common starting premix. Then, other gum base ingredients are added to the premix at the gum base mixer stage.

A common elastomer emulsion also allows for efficient utilization of gum base mixers. For production runs of large quantities of standard base formulations, at least a group of gum base mixers can be employed virtually continually to produce the same standard base formulation, reducing the need to clean gum base mixers between formulation changeovers. When lower-volume production runs of specialty bases are necessary, only certain of the gum base mixers would need to be employed, and cleaned between formulation changeovers.

The quality of the finished gum base is increased because a common emulsion decreases the risk of variability between batches. Further, because pump addition is more regulated than weighing and transporting dry ingredients, and because shorter mixing times are achieved by using emulsified elastomers, the final texture and chew of the finished gum base are more consistently desirable.

BRIEF DESCRIPTION OF THE DRAWINGS

FIG. 1 is a schematic of a preferred production plant in which the process of the present invention can be employed.

DETAILED DESCRIPTION OF THE PRESENTLY PREFERRED EMBODIMENTS

A gum base manufacturing plant that can be used to practice the present invention is schematically shown in FIG. 1. The plant includes an emulsion tank 10 which contains a first elastomer/water emulsion (first emulsion), such as that disclosed in U.S. Pat. No. 3,503,917, issued to Oliver W. Burke, and incorporated herein by reference. The first emulsion is transferred to plural gum base mixers when meter valve 12 is opened, and pump 14 feeds the first emulsion through the lines.

To reach a first row of gum base mixers, the first emulsion passes into line 16 when meter valve 18 is open. Diverging from line 16, discharge lines 20, regulated by valves 22, discharge the first emulsion into a plurality of first gum base mixers 24 when valves 22 are opened. Once an appropriate amount of first emulsion is discharged into gum base mixers 24, valves 22 are shut, and return valve 26 is opened so that the first emulsion is pumped through line 28 back to emulsion tank 10. In this manner, the first emulsion continuously circulates within the plant, and is discharged into the gum base mixers as required. To regulate the amount of first emulsion discharged into gum base mixers 24 more precisely, one may place meters (not shown) in lines 20 to regulate the amount of emulsion discharged.

Before and/or after the first emulsion is discharged into gum base mixers 24, additional gum base ingredients, such as other elastomers, elastomer plasticizers (hereinafter "plasticizer"), fillers, and optional ingredients such as waxes, fats and oils, colorants and antioxidants (collectively hereinafter "additional ingredients") are introduced into the gum base mixers. The additional ingredients and the first emulsion are mixed in mixers 24 under conditions, such as heating and/or vacuum, and for an amount of time such that water is substantially removed from the gum base formulation, and finished gum base is produced.

In a manner analogous to that described for mixers 24, the first emulsion can be discharged into any number of other gum base mixers. For example, the first emulsion reaches a second gum base mixer row through line 30 and through meter valve 32. Diverging from line 30, discharge lines 34, regulated by valves 36, discharge the first emulsion into second gum base mixers 38 when valves 36 are opened. As was the case with mixers 24, once an appropriate amount of the first emulsion is discharged into gum base mixers 38, valves 36 are shut, and return valve 40 is opened so that the first emulsion is pumped through line 28 back to emulsion tank 10.

To produce the same finished gum base in gum base mixers 38 as that produced in gum base mixers 24, the same formulation that was used in gum base mixers 24 is used in gum base mixers 38. Alternatively, different finished gum bases can be produced in gum base mixers 38 by changing the additional ingredients added or by changing the proportions of such ingredients.

The additional ingredients can be introduced in a variety of different forms. Liquefiable ingredients such as plasticizer, fats and waxes can be added in solid form or in a liquid state. Dry powder ingredients such as filler can be added in the powder form or in a slurry of water or liquified gum base ingredient. In the preferred embodiment, at least a portion of the additional ingredients is introduced as a pumpable preblend of at least one liquefiable ingredient and at least one dry powder ingredient, as disclosed in U.S. Pat. No. 5,567,450 to Zuromski et al; (which is incorporated herein by reference).

In an alternative embodiment, at least a portion of the additional ingredients may be mixed with the first emulsion before the emulsion is pumped to the gum base mixers. In this embodiment, the first emulsion passes into lines 42, through meter valves 44. When meter valves 44 is opened, the first emulsion is discharged into primary mixers 50. As disclosed by Zuromski, primary mixers 50 form a pumpable preblend by mixing at least one liquefiable ingredient with at least one dry powder material. In Zuromski, this would be the source of the preblend mixed with the first emulsion in the gum base mixers.

In the alternative, and most preferred, embodiment, the first emulsion forms an elastomer/liquefiable ingredient/dry powder ingredient premix that can be used to make many different finished gum bases. Primary mixers 50 receive liquefiable ingredient from tanks 52 that are regulated by valves 54. Pump 56 feeds the liquefiable ingredient through meter valve 58, meter 60, and through meter valves 62, which regulates the flow of liquefiable ingredient into primary mixers 50. Dry powder ingredients are added to primary mixers 50 via a powder delivery system, such as that disclosed in U.S. Pat. No. 5,248,228 to John C. Giardina, which is incorporated by reference.

When the primary mixers 50 are full, meter valve 58 is shut, and valve 64 is opened so that the liquefiable ingredients are recirculated via return line 66 back to tanks 52. In the preferred embodiment, liquefiable ingredients are kept under a non-oxidizing environment (e.g., a nitrogen blanket), and constantly recirculated to resist oxidization of such ingredients.

The premix is used to make different gum base formulations, where each finished gum base is produced by varying the additional ingredients, and/or the relative proportions thereof, that are added to the premix. This premix is in a liquid form having a viscosity less than about $2 \times 10^6$ cps, and is also pumpable to the gum base mixers.

The premix is discharged through valves 68, and fed by slurry pump 70 into a ribbon blender or other mixer 72. While the first emulsion is normally a pumpable liquid, a preblend of the liquefiable ingredient and dry powder material requires agitation and, preferably, heat to remain pumpable. A premix comprising such a preblend mixed with the first emulsion may also require agitation and preferably heat to remain pumpable. Ribbon blender 72, which acts as an intermediate storage vessel to hold the preblend under agitation and preferably heat, is also used to store the premix under agitation and preferably heat when the premix requires such conditions to remain pumpable.

Slurry pump 74 feeds the premix to gum base mixers 24 and 38. The pipes are preferably insulated to minimize heat loss, so that the premix (or preblend) remains pumpable. Line 76 carries the premix to mixers 24, while line 78 carries the premix to mixers 38. Both lines 76 and 78 are regulated by meter valves 80 and meters 82. Lines 84 diverge from lines 76 and 78 and discharge the premix into the gum base mixers when valves 86 are open.

Once an appropriate amount of the premix is discharged into the gum base mixers, valves 86 are shut, and return valves 88 are opened so that the premix is returned through line 90 and back pressure orifice 92 (to relieve any excess pressure) to ribbon blender 72. In this manner, the premix continuously circulates between the ribbon blender and the gum base mixers so that it is discharged into the gum base mixers as required.

Lines 76 and 78 also incorporate a bypass system of bypass lines 94 and bypass valves 96 to keep the premix moving in the lines. In addition, to regulate the amount of premix discharged into the gum base mixers more precisely, one may also place meters in lines 84 to regulate the amount of premix discharged.

In another embodiment, a second emulsion tank 100 stores either the first emulsified elastomer or a second emulsified elastomer (hereinafter "second emulsion"). The elastomer in vessel 100 is pumped through the piping shown to gum base mixers 24 and 38 when meter valve 102 is opened, and pump 104 feeds the emulsion through the lines.

To reach gum base mixers 24, the emulsion passes into line 106 when meter valve 108 is open. Diverging from line 106, discharge lines 110, regulated by valves 112, discharge the emulsion into gum base mixers 24 when valves 112 are opened. Once an appropriate amount of emulsion is discharged into gum base mixers 24, valves 112 are shut, and return valve 114 is opened so that the emulsion is pumped through line 116 back to emulsion tank 100. In this manner, the emulsion circulates continuously between the emulsion tank and the gum base mixers, and is discharged into the gum base mixers as required. To regulate the amount of emulsion discharged into gum base mixers 24 more precisely, one may place meters in line 110 to regulate the amount of emulsion discharged.

As with the first emulsion, the emulsion from tank 100 can also be discharged into gum base mixers 38. This is accomplished by passing into line 118 and through meter valve 120. Discharge lines 122, regulated by valves 124, discharge the emulsion into gum base mixers 38 when valves 124 are opened. Once an appropriate amount of the emulsion is discharged into gum base mixers 38, valves 124 are shut, and return valve 126 is opened so that the first emulsion is pumped through line 116 back to emulsion tank 100.

As with the first emulsion from tank 10, the emulsion from tank 100 can also be discharged directly into primary mixers 50. Line 128 discharges the emulsion from tank 100 into the primary mixers when meter valves 130 are opened.

The economy and flexibility of this invention is readily apparent. Depending on the requirements of the customer, one can have the same or different elastomer emulsions in tanks 10 and 100. When the elastomers are different, different premixes can be made in primary mixers 50 by adding a first emulsion, a second emulsion, or a combination of the two emulsions. In addition, besides varying the additional ingredients added to the gum base mixers, one can also selectively add a first emulsion, a second emulsion, or a combination of the two emulsions to the gum base mixers.

By final weight of gum base, the elastomer content ranges from 2.0 to about 70.0%, preferably about 3.0 to about 60.0% (unless specified otherwise, all percentages are weight percents). Elastomer plasticizer is present in an amount of about 1.0 to 70.0%, preferably about 1.0–45.0%. Filler is present in an amount of about 1.0 to 75.0%, preferably about 5.0 to about 60.0%. Optional waxes are present in an amount of about 0.0 to 30.0%, preferably 0.0 to 20.0%, while fats and oils range from 0.0 to 30.0%, preferably 0.0 to 20.0%.

Elastomers suitable for use in the elastomer emulsion include the synthetic elastomers. Other optional elastomers used in the gum base include both synthetic and natural elastomers. At least one of the synthetic elastomers is added in emulsion form, and the optional synthetic or natural elastomers are added in either the solid or liquid form.

Natural elastomers include natural rubber such as smoked or liquid latex and guayule, natural gums such as jelutong, lechi caspi perillo, massaranduba balata, massaranduba chocolate, nispero, rosidinha, chicle, gutta percha, gutta kataiu, niger gutta, tunu, chilte, chiquibul, gutta hang kang. Synthetic elastomers include high molecular weight elastomers such as styrene-butadiene copolymers, isobutylene-isoprene copolymers, low to high molecular weight elastomers such as polybutadiene and polyisobutylene, vinyl polymeric elastomers such as polyvinyl acetate (PVAc), polyethylene, vinyl copolymeric elastomers such as vinyl acetate/vinyl laurate, vinyl acetate/vinyl stearate, ethylene/ vinyl acetate, polyvinyl alcohol or mixtures thereof.

Styrene-butadiene type elastomers (hereinafter "SBR") as they may be called, typically are copolymers of from about 20:80 to 60:40 styrene:butadiene monomers. The ratio of these monomers effects the elasticity of the SBR as evaluated as mooney viscosity. As the styrene:butadiene ratio decreases, the mooney viscosity decreases. The structure of SBR typically consists of straight chain 1,3-butadiene copolymerized with phenylethylene (styrene), and provides a non-linear elastomer. SBR is available as a latex emulsion.

Other non-linear elastomers include: the copolymer of branched 2-methyl-1,3-butadiene (isoprene) and branched 2-methylpropene (isobutylene) (the copolymer is hereinafter "butyl rubber"); and polyisobutylene (hereinafter "PIB"). PIB elastomers provide soft chew characteristics to the gum base and still provide the elastic qualities as do the other elastomers. Average molecular weights may range from about 30,000 to 120,000.

Vinyl polymeric and copolymeric type elastomers provide tack resistance, vary the chew characteristics of gums made from these bases having vinyl polymers and offer hydrophilic properties beneficial to sensory perception of the final gums.

For vinyl copolymers, the amount of vinyl laurate, vinyl stearate, or ethylene present in the vinyl laurate/vinyl acetate (VL/VA), vinyl stearate/vinyl acetate (VS/VA), or ethylene/ vinyl acetate (EVA) copolymers respectively typically ranges from about 10 to about 60 percent by weight of the copolymer. Average molecular weights of these polymers may range from about 2000 to about 80000. PVAc having an average molecular weight from about 8000 to about 60000 are preferred for use in the gum base and gum of the present invention. More preferred for chewing gum bases are those of from about 10000 to about 35000 molecular weight. For bubble gum bases, the preferred molecular weight of the PVAc ranges from about 30000 to about 60000.

PVAc is branched in nature. The degree of branching is believed to increase when vinyl acetate monomers are copolymerized with vinyl laurate, vinyl stearate, ethylene and the like. Although vinyl polymers typically release flavor quickly, when used with iso-alkanic waxes that exhibit small crystalline structure when hard, these vinyl polymers extend flavor release.

The preferred elastomers for use in a gum base or gum of the present invention are the synthetic elastomers which include butyl rubber, low to high molecular weight PIB, vinyl polymeric elastomers such as PVAc, polyethylene, vinyl acetate/vinyl laurate, vinyl acetate/vinyl stearate, ethylene/vinyl acetate, polyvinyl alcohol or mixtures thereof.

Preferably, the synthetic elastomers used are emulsified butyl rubber, low to high molecular weight PIB, PVAc, polyethylene, or mixtures thereof. One or more, but not all, of these preferred elastomers may be used in their native solid chunk form, or may be shredded or ground prior to use in the gum base. At least one elastomer is emulsified.

The elastomer emulsions used in the present invention are typical and well known to those in the elastomer emulsion art. Styrene-butadiene rubber and natural rubber latex are commercially available elastomer emulsions.

For butyl rubber, PIB, and vinyl polymers, the solid elastomers are first reduced in size (e.g. by comminution) to less than five centimeters. Next, the ingredient is contacted with a suitable solvent, such as a volatile hydrocarbon solvent such as hexane, then transferred to a vessel for dissolving. The rubber/solvent solution is then dispersed in water through the use of a high shear mixer (i.e., Silverson mixer). An emulsifier may be pre-dissolved in water to stabilize the emulsion. The water/emulsifier solution is then added to the dissolved ingredient under proper pH and further high shear and high speed mixing.

The emulsifier may have an hydrophilic-lipophilic balance (HLB) value greater than 7 for oil-in-water emulsions, or less than 7 for water-in-oil emulsions. Preferably, the emulsifier is of the non-ionic or anionic type with an HLB value greater than 7, and more preferably greater than 10, resulting in an oil-in-water emulsion.

The solvent is then stripped away over time by heat, vacuum or other means, and the resultant emulsion is concentrated to the desired dry solids content via water evaporation or addition.

Preferably, the dry solids content of the emulsion is less than 70 percent by weight of the emulsion, and more preferably, between 10 and 60 percent. Anti-foaming agents may be added to the emulsion to prevent foaming when the emulsion is being concentrated, or when the water is being driven off in the gum base mixers.

For the purposes of the present invention, additional ingredients refer to all gum base ingredients other than the elastomer that is initially delivered as an emulsion. This can include additional elastomers that are shown above. Other additional ingredients include: elastomer plasticizers, fillers and optional ingredients such as softeners, waxes, colorants, antioxidants and antifoaming agents.

Elastomer plasticizers vary the firmness of the gum base. Elastomer plasticizers suitable for use in the present invention include natural rosin esters such as glycerol ester of partially hydrogenated rosin, glycerol ester of polymerized rosin, glycerol ester of partially dimerized rosin, glycerol ester of rosin, glycerol ester of tall oil rosin, pentaerythritol esters of partially hydrogenated rosin, partially hydrogenated methyl esters of rosin, pentaerythritol ester of rosin; synthetic elastomer plasticizers such as terpene resins derived from alpha-pinene, beta-pinene and/or d-limonene; and mixtures thereof. When terpene and rosin ester resins are used in combination, the terpene:rosin ester ratios range from about 1:15 to about 15:1.

Preferably, the plasticizers are natural rosin esters such as glycerol ester of partially hydrogenated rosin, glycerol ester of rosin, glycerol ester of tall oil rosin, partially hydrogenated methyl esters of rosin, synthetic elastomer plasticizers such as terpene resins, and mixtures thereof. More preferably, the plasticizers are glycerol ester of partially hydrogenated rosin, glycerol ester of rosin, glycerol ester of tall oil rosin, synthetic elastomer plasticizers such as terpene resins derived from alpha-pinene, beta-pinene and/or d-limonene and mixtures thereof. Even more preferably, the elastomer plasticizers are used in a liquid (molten) state.

Fillers used in gum base modify the texture of the gum base and aid in processing. Fillers suitable for use in the gum base and gum of the present invention include carbonate or precipitated carbonated types such as magnesium and calcium carbonate, ground limestone and silicate types such as magnesium and aluminum silicate, clay, alumina, talc, as well as titanium oxide, mono-, di- and tricalcium phosphate, cellulose polymers such as ethyl cellulose, methyl cellulose, and wood cellulose, or mixtures thereof.

The particle size of the filler has an effect on cohesiveness, density and processing characteristics of the gum base and its compounding. The smaller the particle size, the more dense and cohesive the final gum base is. Also, by selecting fillers based on their particle size distribution, initial mass compounding may be varied, therefore altering the compounding characteristics of the initial mass during gum base processing, and ultimately the final chew of gums made from these gum bases.

Talc filler may be used in the gum base of the present invention that may come in contact with or employ acid flavors or provide an acidic environment needed to prevent degradation of an artificial sweetener by reacting with calcium carbonate type fillers. Mean particle size for calcium carbonate and talc fillers of the present invention may range from about 0.1 micron to about 15 microns.

Preferably, the fillers used in the gum base and gum of the present invention are calcium carbonate, ground limestone, talc, mono-, di- and tricalcium phosphate, zirconium silicate, or mixtures thereof. More preferably, filler is used as an suspension of filler and hydrophobic gum base ingredients, such as fats, oils, softeners, glycerides, elastomer plasticizers, and the like, or as a suspension of filler and water.

Softeners modify the texture, cause the hydrophobic and hydrophilic components of the base to be miscible and may further plasticize the synthetic elastomers of the gum base. Suitable softeners for use in the gum base of the present invention include triglycerides of non-hydrogenated, partially hydrogenated and fully hydrogenated cottonseed, soybean, palm, palm kernel, coconut, safflower, tallow, cocoa butter, medium chained triglycerides, glycerol triacetate, glycerol mono-oleate, and the like.

The preferred softeners include unsaturated, partially saturated or fully saturated oils that contain, as one or more of their constituent groups, fatty acids of carbon chain length of from 6 to 18. More preferred softeners include the triglycerides having a total summated saturated caproic, caprylic, capric, lauric, myristic and palmitic fatty acid content of from about 8 to about 60 percent by weight of the fatty acids, determined from the fatty acid methyl ester distribution by gas chromatography. The caproic, caprylic, capric, myristic, lauric and palmitic acids of the triglycerides also plasticize the synthetic elastomers more than triglycerides containing predominantly stearic fatty acid. As examples, triglycerides high in saturated lauric fatty acid more effectively plasticize the vinyl laurate/vinyl acetate copolymer, and those high in saturated palmitic fatty acid more effectively plasticize the polyvinyl acetate polymer, increasing the branching. More preferably, the softeners are used in a liquid (molten) state.

Fats and oils can act as softeners or as emulsifiers and defoaming agents. They include monoglycerides, diglycerides, acetylated monoglycerides, distilled mono- and diglycerides and lecithin. They may, from their manufacturing processing, contain triglyceride levels less than 2 percent by weight. Any of these ingredients having triglycerides levels less than 2 percent by weight would not have a significant influence on the fatty acid distribution determined from gas chromatography analysis versus the other total triglycerides present and provided by the oils previously defined as being suitable for the present invention. More preferably, the oils and fats are used as liquid (molten) glycerides.

Wax crystals improve the release of flavor. Those waxes high in iso-alkanes have smaller crystals than waxes high in normal-alkanes, especially those with normal-alkanes of carbon numbers less than 30. A smaller crystal allows a slower release of flavor since the release is more hindered than waxes having larger crystal sizes.

Preferably, the gum base and gum of the present invention employ molten petroleum waxes containing little if any normal- or straight-chained, alkanes, and contain predominantly iso- or branched-chain alkanes, having carbon chain lengths greater than about 30. Formulation of a pre-blend or gum base of this type result in a more homogeneous gum base having greater compatibility among its ingredients. This compatibility is the result of the branched nature of iso-alkanes physically interacting, on a molecular level, with the branched nature of the other gum base ingredients.

The preferred waxes are those of at least 10 mm2/s viscosity, greater than 600 average molecular weight and containing predominantly iso-alkanes (also called randomly branched alkanes) having carbon lengths greater than about 30.

Synthetic waxes are produced by means atypical of petroleum wax production and thus are not considered petroleum wax for the purposes of the present invention. These synthetic waxes may be used in accordance with the present invention and may be included optionally in the gum base and gum.

The optional synthetic waxes may include waxes containing branched alkanes and copolymerized with monomers such as but not limited to propylene and polyethylene and Fischer-Tropsch type waxes. Polyethylene wax is not in the same category as polyethylene, a polymer of ethylene monomers, described above as an elastomer. Rather, for the purposes of the present invention, polyethylene wax is a synthetic wax containing alkane units of varying lengths with ethylene monomers attached.

Wax is an optional ingredient. When used, preferred waxes are used in molten form. However, preferred gum bases and gums are free of iso- or normal-alkane petroleum wax, and, more preferable are substantially free of all wax.

Other optional gum base ingredients include antioxidants and flavoring and coloring. Suitable antioxidants include butylated hydroxyanisole (BHA), butylated hydroxytoluene (BHT), beta-carotenes, tocopherols, acidulants such as Vitamin C, propyl gallate, other synthetic and natural types or mixtures thereof. Preferably, the antioxidants are butylated hydroxyanisole (BHA), butylated hydroxytoluene (BHT), tocopherols, or mixtures thereof.

Suitable gum base colorants and flavorants include FD&C type lakes, plant extracts, fruit and vegetable extracts, titanium dioxide, cocoa powder or mixtures thereof. Preferably, the colorant and flavorant are FD&C lakes and cocoa powder respectively and constitute up to about 5.0% of the gum base. More preferably, they are present at levels from about 0.5 to about 3.0%.

Prior to this invention, a typical gum base required from about one to three hours to produce in gum base mixers that are known in the art. Without modifying the gum base mixers used, substituting an elastomer emulsion for a solid elastomer can substantially reduce the production time of gum base. For example, a 150 minute process can be reduced to about 75 minutes.

Using an elastomer emulsion provides an added and surprising advantage. The emulsified ingredients and the additional ingredients can be added to the gum base formulation at anytime, as opposed to a defined sequence of additions required by prior gum base processes.

Gum formulae typically comprise from about 10 to about 95 weight percent gum base. In accordance with the present invention, chewing gum (in the context of this invention, the term "chewing gum" generally refers to both a chewing and bubble type gum) is made by gum processes that are known in the art from gum bases that are made according to the present invention, described above. The water-soluble portion of the chewing gum may comprise softeners, sweeteners, flavoring agents and combinations thereof. The sweeteners often fill the role of bulking agents in the gum. The bulking agents generally comprise from about 5 percent to about 90 percent, preferably from about 20 percent to about 80 percent, and most preferably from about 30 percent to about 60 percent by weight of the gum.

Softeners, also known in the art as plasticizers or plasticizing agents, generally constitute from about 0.5 percent to about 15.0 percent by weight of the chewing gum. Softeners contemplated for use in the present invention include glycerin, lecithin and combinations thereof. Further, aqueous sweetener solutions such as those containing sorbitol, hydrogenated starch hydrolyzates, corn syrup and combinations thereof may be used as softeners and bulking agents in gum. However, sugar-free formulations are also within the scope of the present invention.

Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination. The sweetener for use in the present invention can also be used in combination with sugarless sweeteners. Generally, sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular sweetness release profile and shelf-life stability needed, bulk sweeteners of the present invention can also be used in combination with coated or uncoated high-intensity sweeteners or with high-intensity sweeteners coated with other materials and by other techniques.

High-intensity sweeteners, or artificial sweeteners and peptide sweeteners as they may be referred to, typically may include, but are not limited to, alitame, thaumatin, aspartame, sucralose, acesulfame, saccharin and dihydrochalcones. The range of these sweetener types in gum may range from about 0.02 to 0.10 weight percent for sweeteners such as alitame, thaumatin and dihydrochalcones, and from about 0.1 to about 0.3 weight percent for sweeteners like aspartame, sucralose, acesulfame and saccharin.

A flavoring agent may be present in the chewing gum in an amount within the range of from about 0.1 to about 10.0 weight percent and preferably from about 0.5 to about 3.0 weight percent of the gum. The flavoring agents may comprise essential oils, synthetic flavors, or mixtures thereof including, but not limited to, oils derived from plants and fruits such as citrus oils, fruit essences, peppermint oil, spearmint oil, clove oil, oil of wintergreen, anise and the like. Artificial flavoring components are also contemplated for use in gums of the present invention. Those skilled in the art will recognize that natural and artificial flavoring agents may be combined in any sensory acceptable blend. All such flavors and flavor blends are contemplated for use in gums of the present invention. Optional gum ingredients such as colors, emulsifiers and pharmaceutical agents may be added to the gum.

EXAMPLES

Gum bases made in accordance with the present invention are shown below in Examples 1–10.

Example 1

Fifteen percent dry filler and 20 percent solid PIB were added to a sigma blade mixer that was heated to 95°–130° C. with a blade speed of from 200 to 270 rpm. The mass was allowed to blend for 10 minutes. Next, 10 percent (by weight of the base and as dry solids weight) emulsified butyl rubber was added and the mass was allowed to blend for 30 more minutes as the water was substantially driven off. Next, 30 percent solid PVAc was added and blended for 20 more minutes. Next, 25 percent softeners were added and blended until the mass became homogeneous. The base was removed from the mixer after a total of 135 minutes mixing time.

The gum base was as homogeneous as the control gum base using solid butyl rubber and smoother than the control gum base.

Example 2

A base as in EXAMPLE 1 except the softeners, PVAc and PIB were first heated until molten or fluid, and the filler was blended with water to form a suitably fluid dispersion ("filler slurry"). The above ingredients were all added at the start and allowed to mix for 25 minutes. The liquid butyl rubber was added and the base was removed from the mixer after 75 minutes of total mixing. In contrast, a typical gum base using the same ingredients in solid form requires 15 to 45 minutes initial compounding and 2 to 2½ hours until being removed from the mixer.

The gum base made using the emulsion was more gutsy and smooth—an improvement over the soft and less gutsy control gum base.

Example 3

A gum base like that of EXAMPLE 2 was made except the liquid butyl emulsion was added at the start. The gum base was allowed to mix for 75 minutes and removed. Its characteristics were identical to the base of EXAMPLE 2.

Example 4

The inventive base of EXAMPLE 3 was made using 5 percent more softener with a reduction in dry filler. The final base was softer in stiffness and viscosity than the gum base of EXAMPLE 1.

Example 5

Eight percent dry filler and 10 percent solid PIB were added to a sigma blade mixer that was heated to 95°–130° C. with a blade speed of from 200 to 270 rpm. The mass was allowed to blend for 10 minutes. Next, 30 percent (by weight of the base and as dry solids weight) emulsified butyl rubber and 15% elastomer plasticizer were added and the mass was allowed to blend for 30 more minutes as the water was substantially driven off. Next, 15 percent solid PVAc was added and blended for 20 more minutes. Next, 12 percent softeners and 10 percent solid wax were added and blended until the mass became homogeneous. The base was removed from the mixer after a total of 135 minutes mixing time.

The gum base blended as well as the previous examples and was smooth and homogeneous when removed from the mixer.

Example 6

Eight percent dry filler and 10 percent solid PIB were added to a sigma blade mixer that was heated to 95°–130° C. with a blade speed of from 200 to 270 rpm. The mass was allowed to blend for 10 minutes. Next, 30 percent (by weight of the base and as dry solids weight) emulsified butyl rubber was added and the mass was allowed to blend for 30 more minutes as the water was substantially driven off. Next, 15 percent solid PVAc was added and blended for 20 more minutes. Next, 10 percent solid wax and 15 percent elastomer plasticizer were added and blended for another 10 minutes. Next, 12 percent softeners were added and blended until the mass became homogeneous. The base was removed from the mixer after a total of 135 minutes mixing time.

The base blended as well as the previous examples and was smooth and homogeneous when removed from the mixer.

Example 7

Twenty-six percent filler slurry, 12 percent emulsified PIB and 18 percent elastomer plasticizer were added to a sigma blade mixer that was heated to 95°–130° C. with a blade speed of from 200 to 270 rpm. The mass was allowed to blend for 25 minutes. Next, eight percent (by weight of the base and as dry solids weight) emulsified butyl rubber, 24 percent molten softener and 12 percent molten wax were added and the mass was allowed to blend for 50 more minutes as the water was substantially driven off to form a finished gum base in 75 minutes.

Slight foaming of the water during evaporation was noticed and the foaming subsided within 1 to 3 minutes.

Example 8

Twenty-six percent filler slurry, 18% molten elastomer plasticizer, 8 percent (by weight of the base and as dry solids weight) emulsified butyl rubber and 12 percent emulsified PIB were added to a sigma blade mixer that was heated to 95°–130° C. with a blade speed of from 200 to 270 rpm. The mass was allowed to blend for 25 minutes. Next, 24 percent molten softeners and 12 percent molten wax were added and the mass was allowed to blend for 50 minutes as the water was substantially driven off to form a gum base in 75 minutes.

Slight foaming of the water during evaporation was noticed and the foaming subsided within 1 to 3 minutes.

Example 9

A gum base as in EXAMPLE 8 was prepared except four percent liquid (molten) mono- and di-glyceride anti-foaming agent (having 48 percent alpha mono, and 57 percent total mono by weight of the glyceride) was added at the start of the process. Filler solids was decreased by 4 percent. Foaming was present for only about 5 to 15 seconds.

Example 10

A gum base as in EXAMPLE 2 was prepared except PVAc was added in an emulsified form instead of in a molten form.

Gums were made from exemplary gum bases 1–10, using typical gum ingredients. These typical gum formulas are presented in Table 1 to exemplify embodiments of the present invention.

TABLE 1

| Gum Formulae of the Present Invention | | | | | | | | | | |
|---|---|---|---|---|---|---|---|---|---|---|
| Gum Base # | 1 | 2 | 3 | 4 | 5 | 6 | 7 | 8 | 9 | 10 |
| Gum Base | 25 | 38 | 22 | 32 | 28 | 53 | 36 | 26 | 27 | 24 |
| Flavor Oil | 0.7 | 1.2 | 1.9 | 1.4 | 0.5 | 1.1 | 1.2 | 1.9 | 0.8 | 1.6 |
| Sugar | 54 | 45 | 40 | — | — | — | 37 | 33 | 55 | 36 |
| Sorbitol | — | — | — | 58 | 55 | 35 | — | — | — | — |
| Corn Syrup | 18 | 12 | 35 | — | — | — | 17 | 38 | 15 | 25 |
| Hydrogenated Starch | — | — | — | — | — | — | — | — | — | 5.0 |

TABLE 1-continued

| | Gum Formulae of the Present Invention | | | | | | | | | |
|---|---|---|---|---|---|---|---|---|---|---|
| Gum Base # | 1 | 2 | 3 | 4 | 5 | 6 | 7 | 8 | 9 | 10 |
| Hydrolysate | — | — | — | — | — | — | — | — | — | — |
| Glycerine | 1.6 | 3.1 | — | 6.4 | 16.5 | 9.8 | 6.1 | — | 1.4 | 8.4 |
| Lecithin | — | 0.7 | — | 2.0 | — | 1.0 | 0.7 | — | — | — |
| Water | 0.7 | — | — | — | — | — | 2.0 | — | 0.8 | — |
| Artificial Sweeteners | — | — | — | 0.2 | — | 0.1 | — | — | — | — |
| Fruit Acids | — | — | 1.1 | — | — | — | — | 1.1 | — | — |

The foregoing detailed description and examples should be regarded as illustrative rather than limiting. The scope of the invention is defined by the claims that follow, including all equivalents.

We claim:

1. A process for producing a chewing gum base comprising:
   (a) pumping a first emulsion comprising a chewing gum elastomer and water to at least two mixers, the emulsion having a viscosity less than about $2 \times 10^6$ cps;
   (b) introducing a filler material into the at least two mixers;
   (c) introducing an elastomer plasticizer into the at least two mixers; and
   (d) mixing the contents of the mixers under conditions that substantially remove the water.

2. The process according to claim 1, wherein the elastomer is a synthetic elastomer or a mixture of synthetic elastomers.

3. The process according to claim 1, wherein the elastomer is selected from the group consisting of styrene butadiene rubber, butyl rubber, polyvinyl elastomers, polyisobutylene and mixtures thereof.

4. The process according to claim 1, wherein the filler material is selected from the group consisting of magnesium carbonate, calcium carbonate, magnesium silicate, aluminum silicate, zirconium silicate, calcium phosphate, titanium oxide, monocalcium phosphate, dicalcium phosphate, tricalcium phosphate, ground limestone, clay alumina, talc, cellulosic polymers, and mixtures thereof.

5. The process according to claim 1, wherein the elastomer plasticizer is selected from the group consisting of rosin esters, terpene resins, triglycerides, monoglycerides, diglycerides, acetylated monoglycerides, lecithin, polyvinyl acetate and mixtures thereof.

6. The process according to claim 1, wherein the gum base produced in the first mixer is different than the gum base produced in the second mixer.

7. The process according to claim 1, wherein at least a portion of the elastomer plasticizer is mixed with the emulsion before the emulsion is pumped to the mixers, the mixture having a viscosity of less than about $2 \times 10^6$ cps.

8. The process according to claim 1, wherein at least a portion of the filler material is mixed with the emulsion before the emulsion is pumped to the mixers, the mixture having a viscosity of less than about $2 \times 10^6$ cps.

9. The process according to claim 1, wherein the elastomer plasticizer and the filler material are introduced to at least one of the mixers after the emulsion is pumped to the mixer.

10. The process according to claim 1, wherein the elastomer plasticizer is introduced in a liquid state.

11. The process according to claim 1, wherein the filler material is introduced as a filler material/water slurry.

12. The process according to claim 1, comprising introducing an antifoaming agent to at least one of the mixers.

13. The process according to claim 1, wherein the desired amount of emulsion is pumped to at least one of the mixers in two or more portions.

14. The process according to claim 1, wherein the amount of emulsion pumped to the first mixer is different than the amount of emulsion pumped to the second mixer.

15. The process according to claim 1, wherein the filler material and the elastomer plasticizer comprise a liquid pre-blend having a viscosity less than about $2 \times 10^6$ cps.

16. The process according to claim 1, wherein the emulsion is pumped in a closed loop path about a gum base manufacture facility.

17. The process according to claim 1, further comprising pumping a second emulsion comprising the same or a different elastomer and water to at least one of the mixers, the second emulsion having a viscosity less than about $2 \times 10^6$ cps.

18. The process according to claim 17, wherein the elastomer in the first emulsion is different than the elastomer in the second emulsion.

19. The process according to claim 17, wherein the elastomer plasticizer or the filler is mixed with at least one of the emulsions before the mixture is pumped into at least one of the mixers, and wherein the viscosity of the mixture is less than about $2 \times 10^6$ cps.

20. The process according to claim 17, wherein said first emulsion and said second emulsion are pumped to the first mixer at a first ratio, and said first emulsion and said second emulsion are pumped to the second mixer at a second ratio, the first and second ratios being different such that the gum base produced in the first mixer is different than the gum base produced in the second mixer.

21. The process according to claim 17, wherein each emulsion is pumped in a closed loop path about a gum base manufacture facility.

22. A process for producing a chewing gum base comprising:
   (a) pumping an emulsion comprising a chewing gum elastomer and water to at least two mixers, the emulsion having a viscosity less than about $2 \times 10^6$ cps; and
   (b) pumping to at least one of the mixers, a liquid pre-blend comprising:
      i) one or more liquefiable chewing gum base ingredients selected from the group consisting of a wax, an elastomer plasticizer, a monoglyceride, a diglyceride, a triglyceride, an acetylated monoglyceride and lecithin; and
      ii) one or more dry solid filler material selected from the group consisting of magnesium carbonate, calcium carbonate, magnesium silicate, aluminum silicate, calcium phosphate, clay and talc;
   wherein the pre-blend has a viscosity less than about $2 \times 10^6$ cps; and
   (c) mixing the contents of the mixers under conditions that substantially remove the water.

23. A process for producing a chewing gum base comprising:
   (a) pumping a chewing gum elastomer/water emulsion having a viscosity less than about $2 \times 10^6$ cps into at least two mixers, the elastomer pumped as part of the emulsion comprising about 2% to about 70%;
   (b) introducing about 1% to about 75% of a filler material into the at least two mixers;
   (c) introducing about 1% to about 70% of an elastomer plasticizer into the at least two mixers; and (d) mixing the contents of the mixers under conditions that substantially remove the water, wherein the percentages are by the final weight of the gum base.

24. The process according to claim 23, wherein the gum base making time is less than about 90 minutes.

25. A process for producing a chewing gum base comprising:
   (a) pumping a chewing gum elastomer/water emulsion having a viscosity less than about $2\times10^6$ cps into at least two mixers, the elastomer pumped as part of the emulsion comprising about 3% to about 60%;
   (b) introducing about 5% to about 60% of a filler material into the at least two mixers;
   (c) introducing about 1% to about 45% of an elastomer plasticizer into the at least two mixers; and
   (d) mixing the contents of the mixers under conditions that substantially remove the water, wherein the percentages are by the final weight of the gum base.

26. The process according to claim 25, wherein the gum base making time is less than about 75 minutes.

27. A process for producing a chewing gum base comprising:
   (a) introducing a first emulsion comprising an elastomer selected from the group consisting of polyisobutylene, butyl rubber, polyvinyl acetate and mixtures thereof into a mixer;
   (b) introducing a filler material into the mixer;
   (c) introducing an elastomer plasticizer into the mixer;
   (d) mixing the contents of the mixer under conditions that substantially remove the water and form the chewing gum base.

28. The process of claim 27 wherein the first emulsion has a viscosity of less than about $2\times10^6$ cps.

29. The process of claim 28 wherein the first emulsion is pumped into the mixer.

30. The process of claim 27 further including the step of introducing an antifoaming agent to the mixer prior to step (d).

* * * * *

UNITED STATES PATENT AND TRADEMARK OFFICE
CERTIFICATE OF CORRECTION

PATENT NO. : 5,792,494
DATED : August 11, 1998
INVENTOR(S) : Kenneth M. Kanca et al.

It is certified that error appears in the above-identified patent and that said Letters Patent is hereby corrected as shown below:

On the Title Page

In column 1, item [73], please change "N.Y." to --New Jersey--.

Signed and Sealed this

Twenty-seventh Day of March, 2001

Attest:

NICHOLAS P. GODICI

*Attesting Officer*     *Acting Director of the United States Patent and Trademark Office*